United States Patent
Yamamoto et al.

(10) Patent No.: US 11,886,393 B2
(45) Date of Patent: Jan. 30, 2024

(54) INFORMATION PROCESSING DEVICE, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventors: Takuma Yamamoto, Kanagawa (JP); Kohei Kaibara, Kanagawa (JP); Toru Takahashi, Kanagawa (JP); Masakazu Ketsuka, Kanagawa (JP); Mitsuru Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 12 days.

(21) Appl. No.: 17/644,691

(22) Filed: Dec. 16, 2021

(65) Prior Publication Data
US 2023/0053643 A1  Feb. 23, 2023

(30) Foreign Application Priority Data
Aug. 17, 2021 (JP) ................ 2021-132567

(51) Int. Cl.
*G06F 16/18* (2019.01)
*G06F 16/176* (2019.01)
*H04L 67/55* (2022.01)

(52) U.S. Cl.
CPC ........ *G06F 16/1873* (2019.01); *G06F 16/176* (2019.01); *H04L 67/55* (2022.05)

(58) Field of Classification Search
CPC ..... G06F 16/1873; G06F 16/176; H04L 67/55
USPC .......................................................... 707/638
See application file for complete search history.

(56) References Cited

U.S. PATENT DOCUMENTS

| | | | | |
|---|---|---|---|---|
| 8,428,561 B1* | 4/2013 | Vance | ...................... | H04W 4/21 455/412.2 |
| 8,676,626 B1* | 3/2014 | Vance | ................... | G06Q 10/109 709/204 |
| 8,819,132 B2* | 8/2014 | Serr | ........................ | H04L 51/04 709/204 |
| 11,087,068 B2 | 8/2021 | Denoue et al. | | |
| 11,243,824 B1* | 2/2022 | Meersma | ............... | G06F 40/166 |
| 11,336,703 B1* | 5/2022 | Meersma | ................ | H04L 67/63 |
| 2003/0101190 A1* | 5/2003 | Horvitz | ................. | H04L 67/303 |
| 2010/0306317 A1* | 12/2010 | Serr | ........................ | H04L 51/04 709/205 |

(Continued)

FOREIGN PATENT DOCUMENTS

JP          2018-073387 A    5/2018

*Primary Examiner* — Cam Linh T Nguyen
(74) *Attorney, Agent, or Firm* — Sughrue Mion, PLLC

(57) ABSTRACT

An information processing device includes a processor configured to acquire: when an electronic document is posted to a message exchange service, information on a person who has posted the electronic document and information on update history of the electronic document; specify, based on the acquired information on the person who has posted the electronic document and the acquired information on the update history, a notification destination to whom a notification indicating that the electronic document has been posted is to be provided; and perform control for providing notification information containing at least information indicating the specified notification destination to the notification destination.

11 Claims, 9 Drawing Sheets

(56) References Cited

U.S. PATENT DOCUMENTS

| | | | | |
|---|---|---|---|---|
| 2011/0121966 A1* | 5/2011 | Cavanaugh | | H04L 67/04 |
| | | | | 340/539.13 |
| 2011/0185025 A1* | 7/2011 | Cherukuri | | H04L 12/1813 |
| | | | | 709/206 |
| 2013/0246901 A1* | 9/2013 | Massand | | G06F 40/197 |
| | | | | 715/229 |
| 2014/0289645 A1* | 9/2014 | Megiddo | | G06F 3/048 |
| | | | | 715/753 |
| 2015/0193492 A1* | 7/2015 | Gunaratne | | G06F 40/166 |
| | | | | 709/205 |
| 2015/0370769 A1* | 12/2015 | Pereira Filho | | G06F 40/10 |
| | | | | 726/28 |
| 2016/0092581 A1* | 3/2016 | Joshi | | G06F 16/9535 |
| | | | | 707/732 |
| 2017/0070468 A1* | 3/2017 | Renshaw | | H04W 4/21 |
| 2017/0214643 A1* | 7/2017 | Shukla | | H04L 51/224 |
| 2019/0364001 A1* | 11/2019 | Dotan-Cohen | | G06Q 10/107 |
| 2021/0286861 A1* | 9/2021 | Churchill | | G06F 21/10 |
| 2022/0217247 A1* | 7/2022 | Kamihisa | | H04L 51/02 |

* cited by examiner

FIG. 7

DOCUMENT HISTORY INFORMATION

PERSON WHO HAS MADE AN UPDATE: A
LINE UPDATED: ORIGINAL VERSION
DATE AND TIME: 01/05/2021
COMMENTS:
CONTENTS OF CHANGE: ORIGINAL VERSION    — R1

PERSON WHO HAS MADE AN UPDATE: B
LINE UPDATED: LINE XX, PAGE 2
DATE AND TIME: 01/07/2021
COMMENTS: YYY IS TO BE CORRECTED.
CONTENTS OF CHANGE:    — R2

PERSON WHO HAS MADE AN UPDATE: C
LINE UPDATED: LINE XX, PAGE 4
DATE AND TIME: 01/09/2021
COMMENTS: ZZZ IS TO BE CORRECTED.
CONTENTS OF CHANGE:    — R3

FIG. 9

DOCUMENT HISTORY INFORMATION

PERSON WHO HAS MADE AN UPDATE: A
LINE UPDATED: ORIGINAL VERSION
DATE AND TIME: 01/05/2021
COMMENTS:
CONTENTS OF CHANGE: ORIGINAL VERSION — R1

PERSON WHO HAS MADE AN UPDATE: B
LINE UPDATED: LINE XX, PAGE 2
DATE AND TIME: 01/07/2021
COMMENTS: YYY IS TO BE CORRECTED.
CONTENTS OF CHANGE: — R2

PERSON WHO HAS MADE AN UPDATE: C
LINE UPDATED: LINE XX, PAGE 4
DATE AND TIME: 01/09/2021
COMMENTS: ZZZ IS TO BE CORRECTED.
CONTENTS OF CHANGE: — R3

PERSON WHO HAS MADE AN UPDATE: A
LINE UPDATED: LINE XX, PAGE 2
DATE AND TIME: 01/12/2021
COMMENTS: I HAVE CORRECTED YYY.
CONTENTS OF CHANGE: ○○○○○ — R4

PERSON WHO HAS MADE AN UPDATE: A
LINE UPDATED: LINE XX, PAGE 4
DATE AND TIME: 01/12/2021
COMMENTS: I HAVE CORRECTED ZZZ.
CONTENTS OF CHANGE: ●●●●● — R5

INFORMATION PROCESSING DEVICE, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-132567 filed Aug. 17, 2021.

BACKGROUND

(i) Technical Field

The present disclosure relates to an information processing device, an information processing system, and a non-transitory computer readable medium.

(ii) Related Art

There have been systems for posting electronic documents to a service screen for sharing messages between members in a place to exchange information using a message exchange service, for example, in a group chat that members of a group take part in. Such a system may be used as a tool for allowing a member to review an electronic document posted to a group chat by another member. In Japanese Unexamined Patent Application Publication No. 2018-073387, as a method for making it possible to understand an area of interest in a document layout in a conversation stream through a network as an example of a message exchange service, a method for inserting an automatically generated playable document page snippet into a conversation stream associated with the document is disclosed.

SUMMARY

In the case where an electronic document created by a member is posted requesting for a review to a group chat as a message exchange service and a review result is then posted by another member, the member who has requested the review might not notice the posting of the review result because multiple members take part in the message exchange service. In a similar manner, in the case where an electronic document corrected according to the review result is posted requesting for another review to the group chat, a requested member might not notice the posting for the request for another review.

Aspects of non-limiting embodiments of the present disclosure relate to clarifying to which one of members who are sharing messages in a message exchange service an electronic document posted to the message exchange service is posted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: acquire, when an electronic document is posted to a message exchange service, information on a person who has posted the electronic document and information on update history of the electronic document; specify, based on the acquired information on the person who has posted the electronic document and the acquired information on the update history, a notification destination to whom a notification indicating that the electronic document has been posted is to be provided; and perform control for providing notification information containing at least information indicating the specified notification destination to the notification destination.

BRIEF DESCRIPTION OF THE DRAWINGS

Exemplary embodiments of the present disclosure will be described in detail based on the following figures, wherein:

FIG. 7 is a diagram illustrating a specific example of information on update history of an electronic document posted to a group chat;

FIG. 9 is a diagram illustrating a specific example of information on update history of an electronic document posted to a group chat.

DETAILED DESCRIPTION

Exemplary embodiments of the present disclosure will be described in detail with reference to the attached drawings.

<Configuration of Information Processing System>

Figure 1:
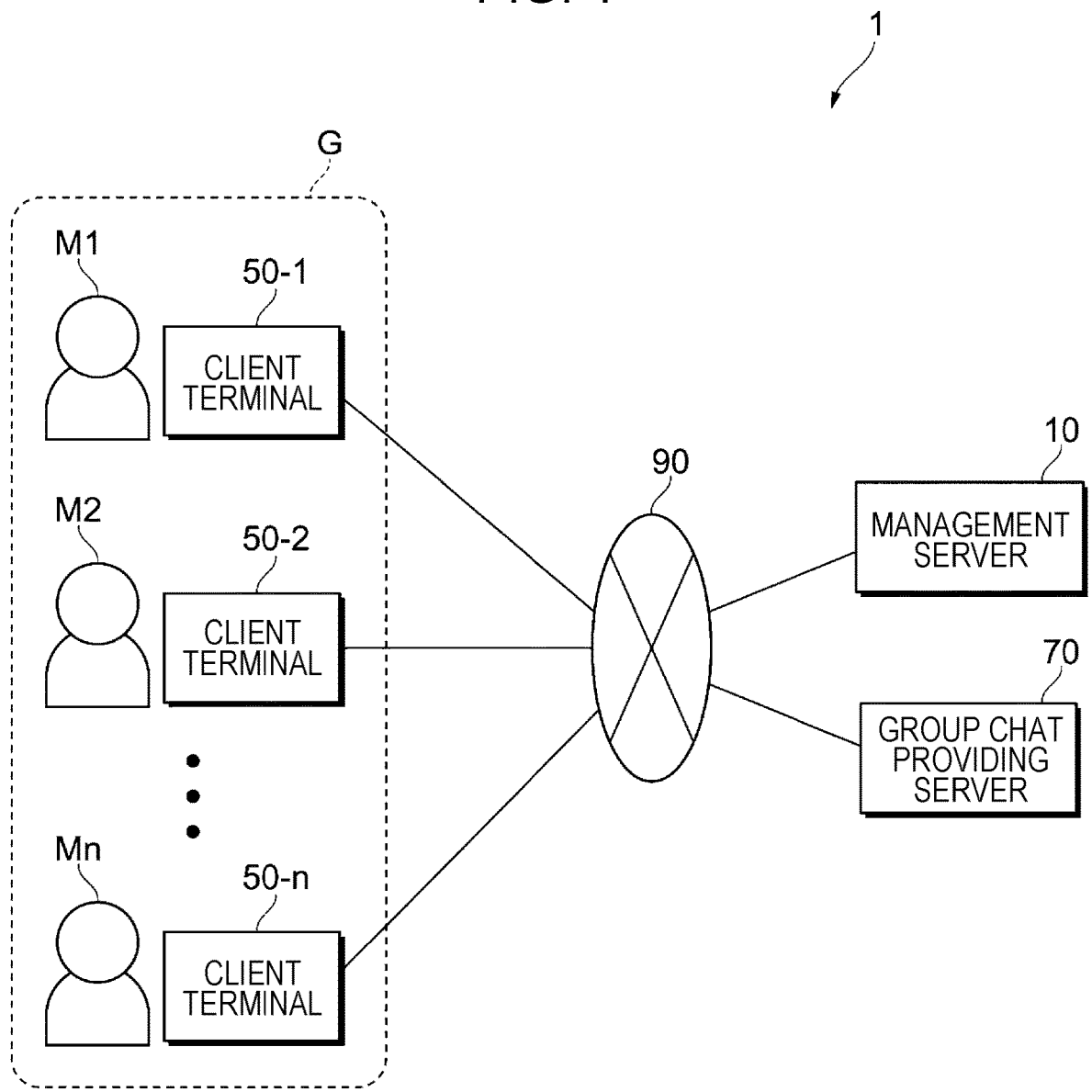
FIG. 1 is a diagram illustrating the entire configuration of an information processing system according to an exemplary embodiment.

FIG. 1 is a diagram illustrating the entire configuration of an information processing system 1 according to an exemplary embodiment.

The information processing system 1 includes a management server 10, client terminals 50-1 to 50-$n$ ($n$ represents an integer of 2 or more), and a group chat providing server 70 that are connected via a network 90. In FIG. 1, only one group chat providing server 70 is illustrated. However, multiple group chat providing servers 70 may be connected to the network 90. The network 90 is, for example, a local area network (LAN) or the Internet.

The management server 10 is an information processing device as a server that manages the entire information processing system 1. For example, when an electronic document is posted to a message exchange service for sharing messages between members M1 to Mn, the management server 10 specifies, on the basis of information on a person who has posted the electronic document and information on update history of the electronic document, a notification destination to whom a notification indicating that the electronic document has been posted is to be provided. Then, the management server 10 performs control for providing notification information containing at least information indicating the specified notification destination to the notification destination. In this exemplary embodiment, the message exchange service is a group chat. The electronic document posted to the group chat is content of an electronic medium. The electronic document may be, for example, a document file or an image (still image or video) file stored in advance in the client terminals 50-1 to 50-n.

The client terminals 50-1 to 50-n are information processing devices such as smartphones, personal computers, or tablet terminals used by members M1 to Mn, respectively, composing a group G. The client terminals 50-1 to 50-n display service screens for a group chat used by the members M1 to Mn, respectively. Hereinafter, in the case where there is no need to distinguish among the client terminals 50-1 to 50-n and distinguish among the members M1 to Mn, the client terminals 50-1 to 50-n and the members M1 to Mn will be referred to as client terminals 50 and members M, respectively.

The group chat providing server 70 is an information processing device serving as a server that provides a group chat to the members M. A person who manages the group chat providing server 70 and a person who manages the management server 10 may be or may not be the same.

<Hardware Configuration of Management Server>

Figure 2:
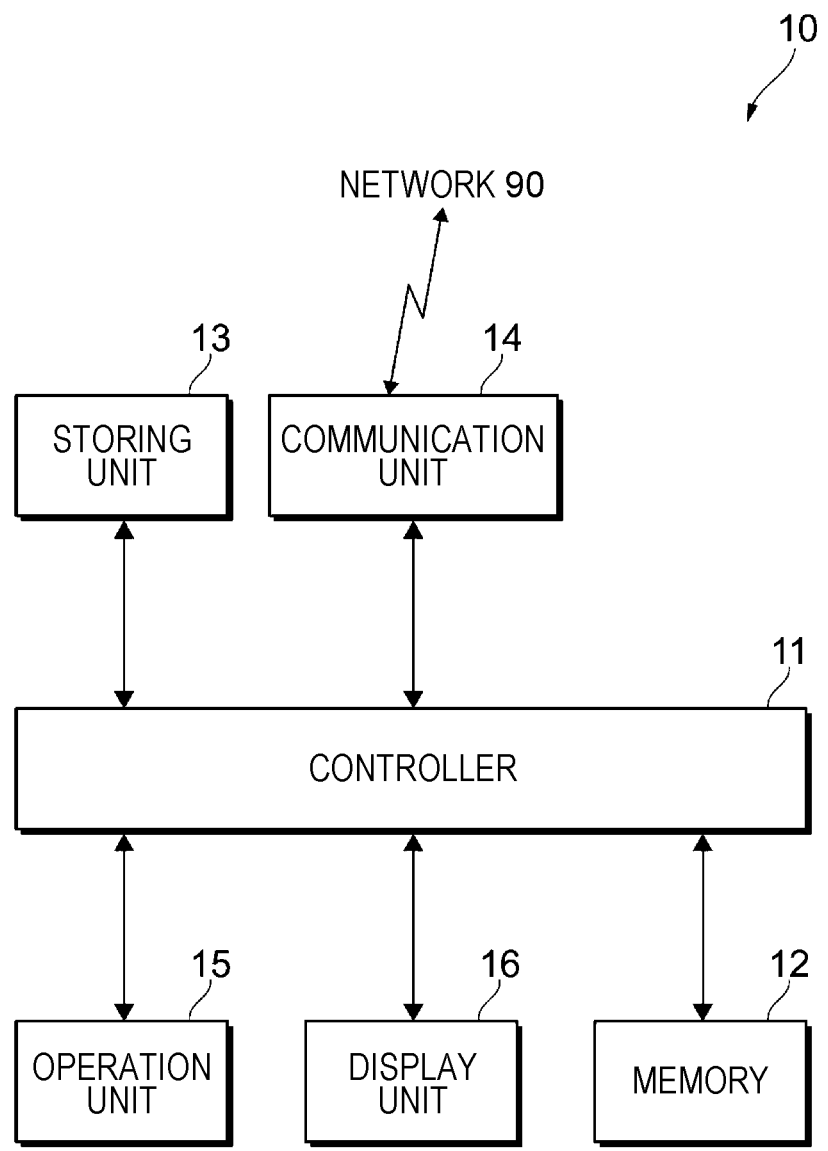
FIG. 2 is a diagram illustrating a hardware configuration of a management server.

FIG. 2 is a diagram illustrating a hardware configuration of the management server 10.

The management server 10 includes a controller 11, a memory 12, a storing unit 13, a communication unit 14, an operation unit 15, and a display unit 16. These units are connected by a data bus, an address bus, a peripheral component interconnect (PCI) bus, or the like.

The controller 11 is a processor that controls the operation of the management server 10 by executing various types of software such as operating software (OS) and application software. The controller 11 includes, for example, a central processing unit (CPU). The memory 12 is a storage region that stores various types of software, data to be used for execution of the various types of software, and the like and is used as a work area for arithmetic operations. The memory 12 includes, for example, a random access memory (RAM).

The storing unit 13 is a storage region that stores input data to be input to various types of software, output data output from the various types of software, and the like. The storing unit 13 includes, for example, a hard disk drive (HDD), a solid state drive (SSD), a semiconductor memory, or the like used for storing a program, various setting data, and the like. The communication unit 14 transmits and receives data via the network 90. For example, the communication unit 14 transmits and receives data to and from the client terminals 50 and the group chat providing server 70.

The operation unit 15 includes, for example, a keyboard, a mouse, a machine button, and a switch and receives input operations. The operation unit 15 also includes a touch sensor integrated with the display unit 16 to configure a touch panel. The display unit 16 displays images, text information, and the like. The display unit 16 includes, for example, a liquid crystal display or an organic electroluminescence (EL) display used for displaying information.

<Hardware Configuration of Client Terminal and Group Chat Providing Server>

The hardware configurations of the client terminals 50 and the group chat providing server 70 is similar to the hardware configuration of the management server 10 illustrated in FIG. 2. Thus, illustration and description of the hardware configurations of the client terminals 50 and the group chat providing server 70 will be omitted.

<Functional Configuration of Controller of Management Server>

Figure 3:
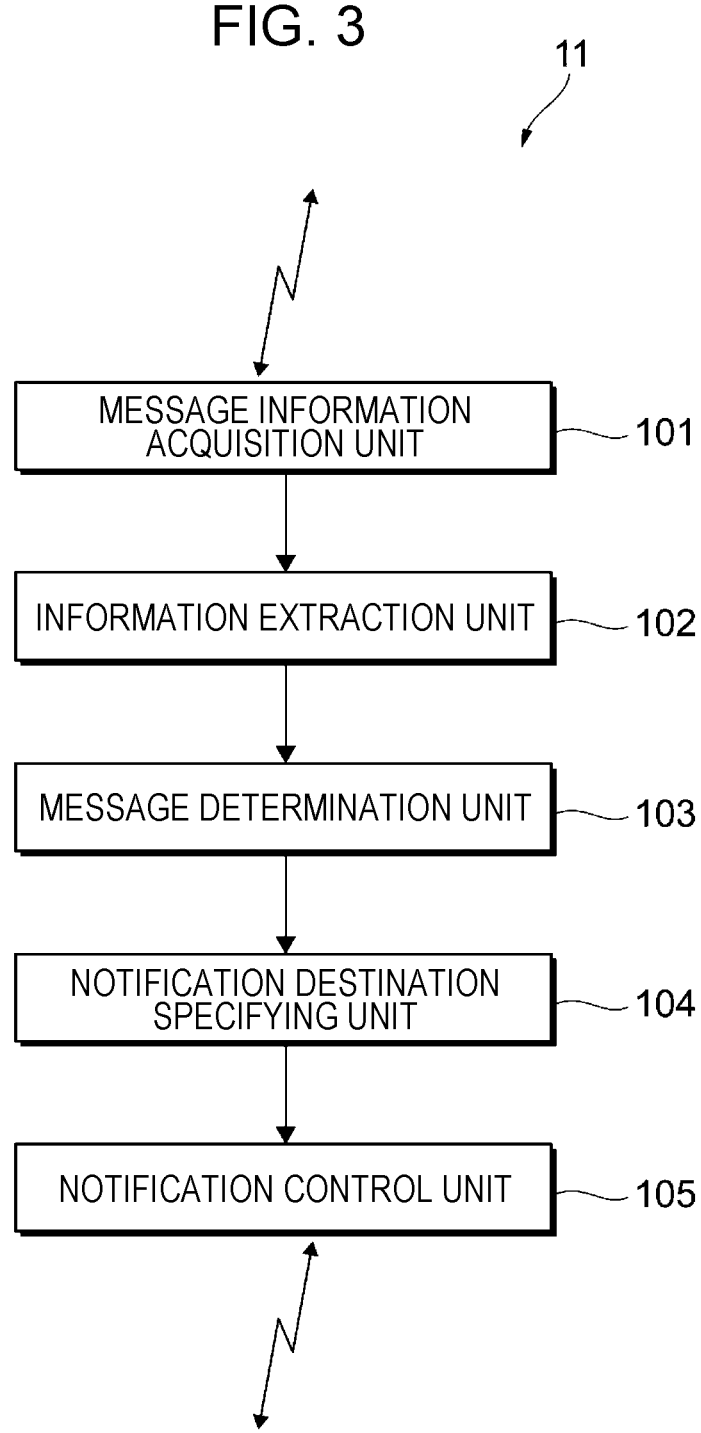
FIG. 3 is a diagram illustrating a functional configuration of a controller of the management server.

FIG. 3 is a diagram illustrating a functional configuration of the controller 11 of the management server 10.

The controller 11 of the management server 10 includes a message information acquisition unit 101, an information extraction unit 102, a message determination unit 103, a notification destination specifying unit 104, and a notification control unit 105.

The message information acquisition unit 101 acquires information on a message posted in a group chat. The acquired information on the message contains information on a person who has posted the message and information on an electronic document attached to the message.

The information extraction unit 102 extracts the information on the person who has posted the message and the information on an electronic document attached to the message from the information on the message acquired by the message information acquisition unit 101. The information extraction unit 102 extracts, as the information on the person who has posted the message, for example, information for uniquely identifying the person who has posted the message, the name of the person who has posted the message, or the like. For example, the information extraction unit 102 extracts, as the information on an electronic document attached to the message, information on whether or not an electronic document is attached, information on update history of the electronic document attached to the message, and the like. The information on the update history of the electronic document contains, for example, a person who has created the original version of the electronic document, the date and time when the original version of the electronic document was created, contents of a comment from the person who has created the original version of the electronic document, a person who has made an update in the case where the electronic document has been updated, the date and time when an update was made, a part updated, contents of a comment from the person who has made an update, and the like.

In this exemplary embodiment, a "comment" represents a wording input using a so-called comment function that a typical electronic document has. A comment is not making a change to contents of an electronic document but providing advice on the contents of the electronic document. A comment is typically displayed in the margin in such a manner that a target part is specified or displayed superimposed on a target part. Furthermore, depending on the function of the electronic document, switching between display and non-display of a comment may be performed. In this exemplary embodiment, contents of a comment input using a comment function that a typical electronic document has and information indicating a part corresponding to the comment are automatically reflected in the contents of the message.

The message determination unit 103 determines, based on the information on whether or not an electronic document is attached of the information extracted by the information extraction unit 102 on an electronic document attached to the message, whether or not an electronic document is attached to the posted message.

In the case where it is determined, in accordance with the determination result obtained by the message determination unit 103, that an electronic document is attached to the message, the notification destination specifying unit 104 specifies, based on the information on the person who has posted the message and the information on the update history of the electronic document attached to the message, a notification destination to whom a notification indicating that the electronic document has been posted to the group chat is to be provided. The notification destination is specified from among the members M1 to Mn for the group chat. "An electronic document is posted to a group chat" represents that a message to which an electronic document is attached is posted to a group chat.

The notification destination specifying unit 104 specifies a notification destination to whom a notification indicating that the electronic document has been posted to the group chat is to be provided. Specifically, the notification destination specifying unit 104 specifies, based on who among the members M1 to Mn are the person who has posted the message, the person being able to be identified from the information on the person who has posted the electronic document, the person who has created the original version of the electronic document attached to the message, and the person who has made an update to the electronic document, the persons being able to be identified from the information on the update history of the electronic document, a notification destination to whom a notification indicating that the electronic document has been posted to the group chat is to be provided.

For example, in the case where the person who has posted the message is the person who has made the latest update to the electronic document attached to the message and is not the person who has created the original version of the electronic document, the notification destination specifying unit 104 specifies the person who has created the original version of the electronic document as the notification destination. Furthermore, for example, in the case where the person who has posted the message, the person who has made the latest update to the electronic document attached to the message, and the person who has created the original version of the electronic document are the same, the notification destination specifying unit 104 specifies another person who has made an update which has caused the latest update to the electronic document as the notification destination.

Furthermore, the notification destination specifying unit 104 specifies, as the notification destination, a person different from the person who has created the original version of the electronic document attached to the message out of persons who have made updates of the latest updated part of the electronic document, the persons being identified from the information on the update history of the electronic document attached to the message. For example, in the case where the number of updates made by the person who has created the original version of the electronic document to the latest updated part of the electronic document attached to the message is n (n represents an integer of 2 or more), the notification destination specifying unit 104 specifies, as the notification destination, a person who is different from the person who has created the original version and has made an update to the part later than the n-1th update. A process for specifying a notification destination for notification information and a specific example of the process will be described below with reference to FIGS. 5 to 9.

The notification control unit 105 performs control for providing notification information containing at least information indicating the notification destination to whom a notification indicating that the electronic document has been posted to the group chat is to be provided, the notification destination being specified by the notification destination specifying unit 104, to the notification destination. The "control for providing notification information to the notification destination" represents performing a process or procedure necessary for providing notification information to the notification destination specified by the notification destination specifying unit 104. The notification control unit 105 performs, as the control for providing notification information to the notification destination, for example, control for displaying the notification information on the screen for the group chat. In this case, the notification control unit 105 performs, for example, a process or procedure necessary for displaying the notification information in a message posted to the group chat or a process or procedure necessary for providing an alert display on the client terminal 50.

The notification control unit 105 performs control for providing, as the notification information, for example, information containing information indicating a part of the electronic document attached to the message on which an update has been made to the notification destination specified by the notification destination specifying unit 104. The "information indicating a part on which an update has been made" represents, for example, information for identifying a part of an electronic document, such as a page and a line, on which an update has been made. The "information indicating a part on which an update has been made" that is provided as notification information represents information indicating a part on which a new update has been made, and "information indicating a part on which an update has been made" that was previously provided is not provided. In this case, the notification control unit 105 performs, based on the date and time of the last posting obtained from the information on the person who has posted the message and the information on the update history of the electronic document, control for providing information indicating the part on which the new update has been made in the current posting to the notification destination.

The notification control unit 105 performs control for providing, as the notification information, for example, information containing information for accessing the electronic document attached to the message to the notification destination specified by the notification destination specifying unit 104. The "information for accessing the electronic document" represents, for example, information for opening the electronic document by an operation such as click or tapping, information for downloading the electronic document, or the like.

<Process Performed by Management Server and Image Reading Device>

Figure 4:
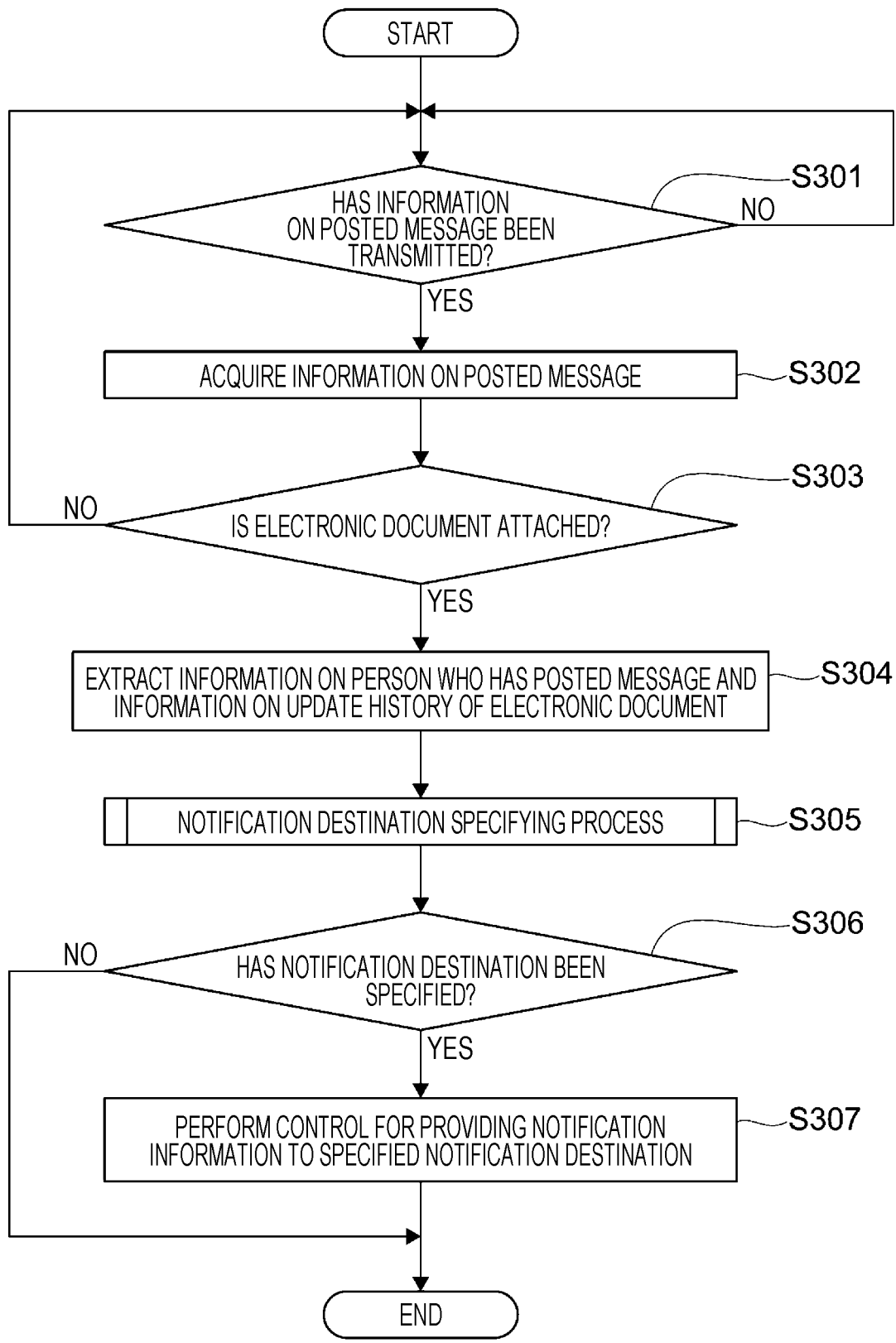
FIG. 4 is a flowchart illustrating a process performed by the management server.

FIG. 4 is a flowchart illustrating a process performed by the management server 10.

As illustrated in FIG. 4, when information on a message posted to a group chat is transmitted to the management server 10 (YES in step 301), the management server 10 acquires the information on the message posted to the group chat (step 302). In contrast, in the case where information on a message posted to a group chat has not been transmitted to the management server 10 (NO in step 301), the management server 10 repeatedly performs the processing of step 301 until information on a message posted to a group chat is transmitted.

In the case where an electronic document is attached to the message posted to the group chat (YES in step 303), the management server 10 extracts information on a person who has posted the message and information on update history of the electronic document (step 304). In contrast, in the case where no electronic document is attached to the message posted to the group chat (NO in step 303), the process returns to step 301. Next, the management server 10 performs a notification destination specifying process illustrated in FIG. 5 (step 305). The notification destination specifying process represents a process for specifying a notification destination for notification information.

Figure 5:
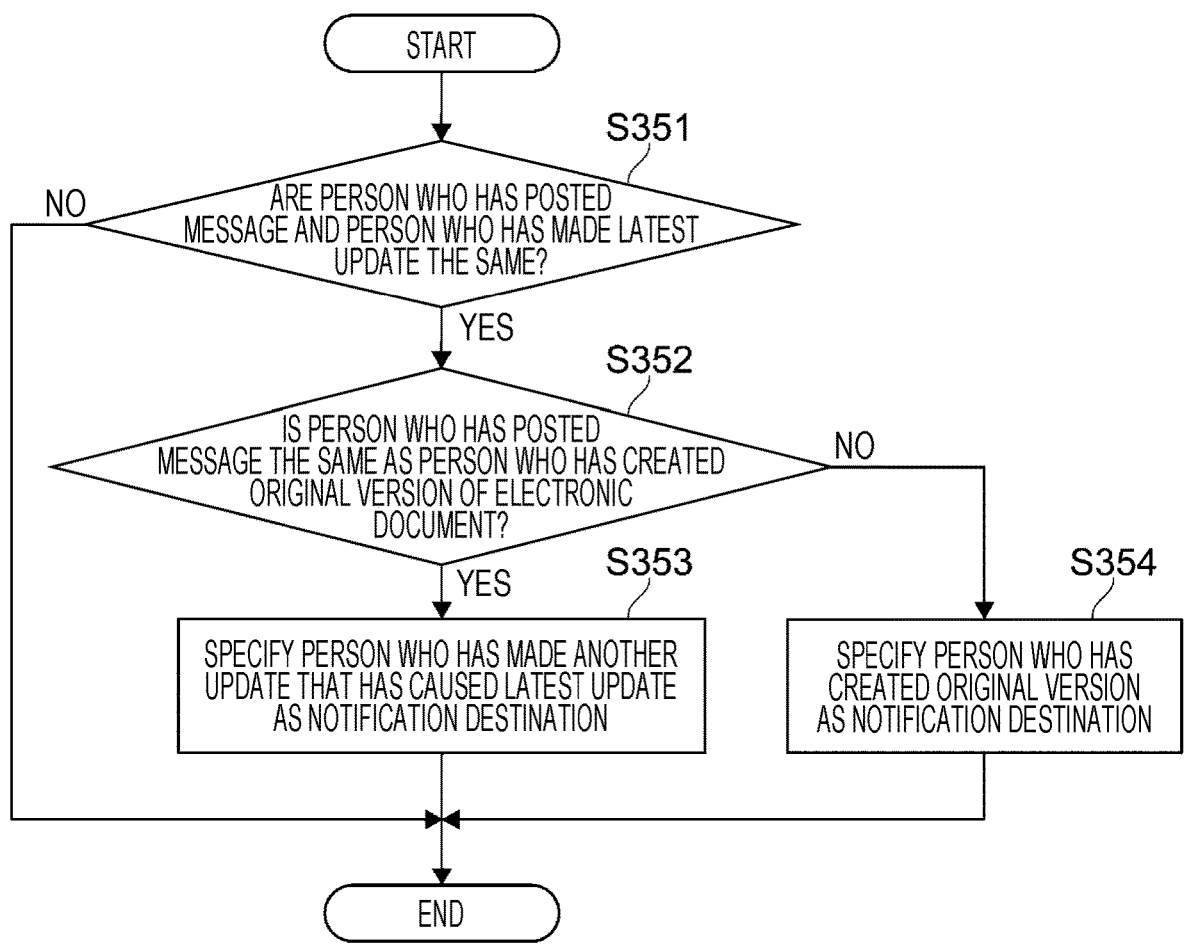
FIG. 5 is a flowchart illustrating a notification destination specifying process in the process performed by the management server.

FIG. 5 is a flowchart illustrating the notification destination specifying process in the process performed by the management server 10.

The management server 10 specifies, based on who among the members M1 to Mn are the person who has posted the message, a person who has created the original version of the electronic document attached to the message, and a person who has made an update to the electronic document, the persons being identified from the information extracted in step 304 of FIG. 4, a notification destination to whom a notification indicating that the electronic document has been posted to the group chat is to be provided. For example, in the case where the person who has posted the message and the person who has made the latest update to the electronic document attached to the message are the same (YES in step 351) and the person who has posted the message and the person who has created the original version of the electronic document are the same (YES in step 352), the management server 10 specifies a person who has made another update that has caused the latest update to the electronic document as a notification destination (step 353). Then, the notification destination specifying process ends, and the management server 10 proceeds to step 306 of FIG. 4.

In contrast, in the case where the person who has posted the message and the person who has made the latest update to the electronic document attached to the message are not the same (NO in step 351), there is no need to provide the notification information because the posted electronic document is not updated. Thus, the management server 10 ends the notification destination specifying process without specifying a notification destination for the notification information, and proceeds to step 306 of FIG. 4. In the case where the person who has posted the message and the person who has made the latest update to the electronic document attached to the message are the same (YES in step 351) and the person who has posted the message and the person who has created the original version of the electronic document attached to the message are not the same (NO in step 352), the management server 10 specifies the person who has created the original version of the electronic document attached to the message as a notification destination for the notification information (step 354). Then, the notification destination specifying process ends, and the management server 10 proceeds to step 306 of FIG. 4.

As illustrated in FIG. 4, in the case where a notification destination has been specified in accordance with the notification destination specifying process (YES in step 306), the management server 10 performs control for providing the notification information to the notification destination specified in the notification destination specifying process (step 307). Then, the process ends. In contrast, in the case where a notification destination has not been specified by the notification destination specifying process (NO in step 306), the process ends.

Figure 6:
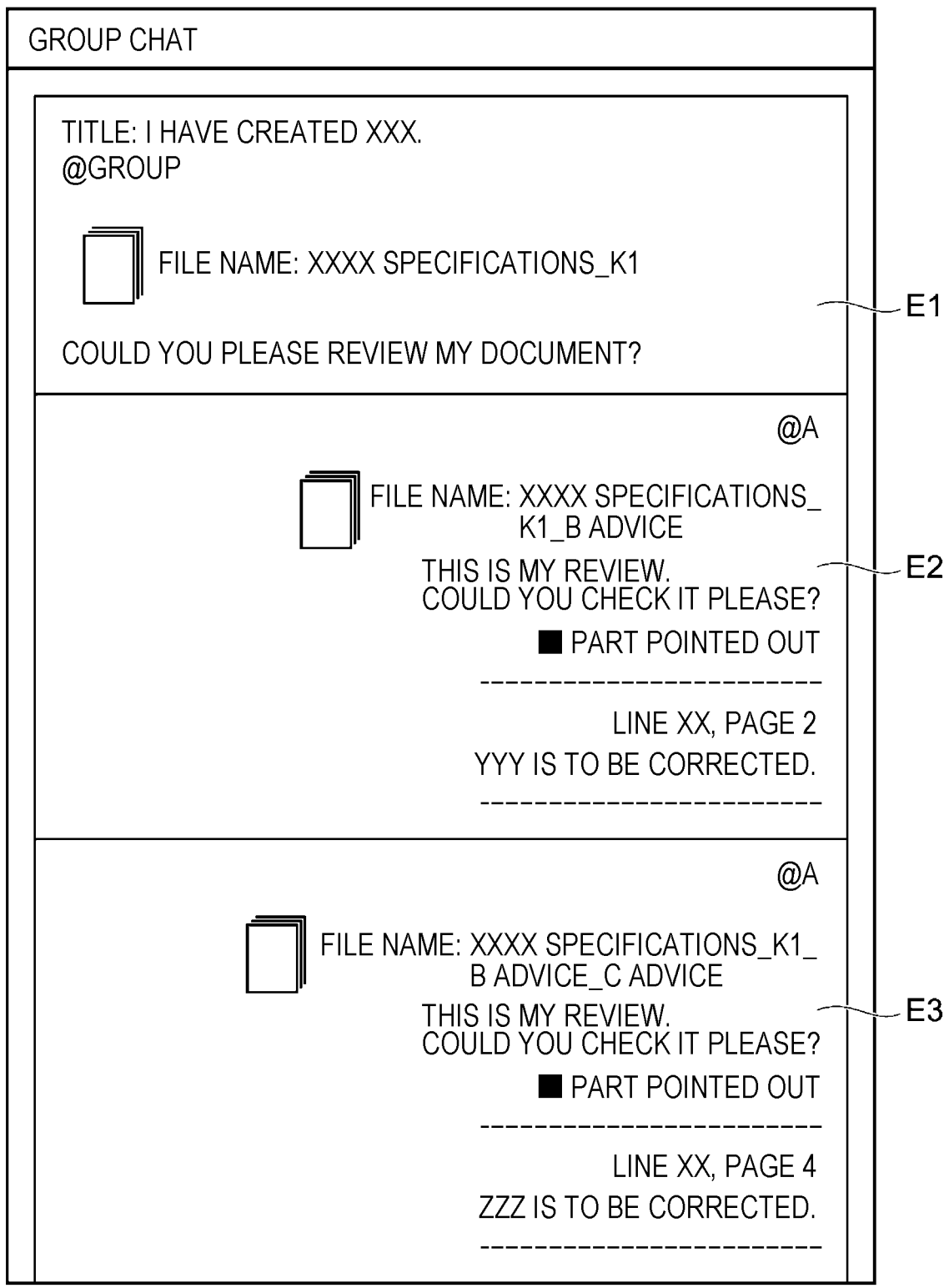
FIG. 6 is a diagram illustrating a specific example of a screen for a group chat displayed on a display unit of a client terminal.

FIG. 6 is a diagram illustrating a specific example of a screen for a group chat displayed on a display unit of the client terminal 50.

The screen for the group chat displayed on the display unit of the client terminal 50 includes one or more threads each including one or more messages E1 to Em (m represents an integer of 1 or more). In FIG. 6, an example of a thread with a title name of "I have created XXX." is illustrated. In this thread, messages E1 to E3 are posted in that order.

Of the messages E1 to E3 in FIG. 6, the message E1 "Could you please review my document?" is posted by the member M1 in group G. An original version of an electronic document (file name "XXXX Specifications_K1") created by the member M1 is attached to the message E1. A wording "@Group" indicating that the notification destination is the group G is displayed in the message E1. Hereinafter, the member M1, who has created the original version of the electronic document, will be referred to as "A".

Of the messages E1 to E3 in FIG. 6, the message E2 "This is my review. Could you check it please?" is posted by the member M2 in the group G. An electronic document (file name "XXXX Specifications_K1_B Advice") is attached to the message E2. This electronic document is obtained by updating, by the member M2, the original version of the electronic document (file name "XXXX Specifications_K1") created by the member M1. Hereinafter, the member M2, who has made an update to the original version of the electronic document, will be referred to as "B".

When the message E2 to which the electronic document (file name "XXXX Specifications_K1_B Advice") is attached is posted to the group chat, information on the message E2 is provided to the management server 10 from the group chat providing server 70 before the message E2 is displayed in the thread. Then, a notification destination to whom a notification indicating that the message E2 has been posted to the group chat is to be provided is specified on the basis of information on the person who has posted the message E2 and information on update history of the electronic document attached to the message E2, these pieces of information being extracted from the information on the message E2. In this case, B is the person who has posted the message E2 and the person who has made the latest update to the electronic document attached to the message E2, while A is the person who has created the original version of the electronic document attached to the message E2. Thus, A is specified as the notification destination for the notification information.

When A is specified as the notification destination for the notification information, control for displaying a wording "@A" indicating that the notification destination is A in the message E2, as control for providing the notification information to A, is performed. Specifically, information indicating that the notification destination for the message E2 is A is provided to the group chat providing server 70 from the management server 10. As a result, as illustrated in FIG. 6, the wording "@A" is displayed as the information indicating that the notification destination is A in the message E2. Thus, only by visually recognizing the message E2 displayed on the screen for the group chat, A is able to immediately understand that the message E2 has been posted to A as a notification destination and review requested from A has been done.

Furthermore, in the message E2, "part pointed out", information "Line XX, Page 2" indicating the part updated, and a comment "YYY is to be corrected." from B are displayed as notification destination information. The above notations are not input into the message E2 by B but are input using a comment function of the electronic document (file name "XXXX Specifications_K1_B Advice") attached to the message E2. Thus, when reviewing the electronic document in response to the request for review from A, B inputs a comment using the comment function of the electronic document. Then, when B posts the electronic document, the contents input using the comment function are automatically reflected in the message E2.

Of the messages E1 to E3 in FIG. 6, the message E3 "This is my review. Could you check it please?" is posted from the member M3 in the group G. An electronic document (file name "XXXX Specifications_K1_B Advice_C Advice") is attached to the message E3. This electronic document is obtained by further updating, by the member M3, the electronic document (file name "XXXX Specifications_K1_B Advice") updated by B. Hereinafter, the member M3 will be referred to as "C".

As described above, when the message E3 to which the electronic document (file name "XXXX Specifications_K1_B Advice_C Advice") is attached is posted to the group chat, information on the message E3 is provided to the management server 10 from the group chat providing server 70 before the message E3 is displayed in the thread. Then, a notification destination to whom a notification indicating that the message E3 has been posted to the group chat is to be provided is specified on the basis of information on the person who has posted the message E3 and information on update history of the electronic document attached to the message E3, these pieces of information being extracted from the information on the message E3. In this case, C is the person who has posted the message E3 and the person who has made the latest update to the electronic document attached to the message E3, while A is the person who has created the original version of the electronic document attached to the message E3. Thus, A is specified as the notification destination for the notification information.

When A is specified as the notification destination for the notification information, control for displaying a wording "@A" indicating that the notification destination is A in the message E3, as control for providing the notification information to A, is performed. Specifically, information indicating that the notification destination for the message E3 is A is provided to the group chat providing server 70 from the management server 10. As a result, as illustrated in FIG. 6, the wording "@A" is displayed as the information indicating that the notification destination is A in the message E3. Thus, only by visually recognizing the message E3 displayed on the screen for the group chat, A is able to immediately understand that the message E3 has been posted to A as a notification destination and review requested from A has been done.

Furthermore, in the message E3, "part pointed out", information "Line XX, Page 4" indicating the part updated, and a comment "ZZZ is to be corrected." from C are displayed as notification destination information. The above notations are not input into the message E3 by C but are input using the comment function of the electronic document (file name "XXXX Specifications_K1_B Advice_C Advice") attached to the message E3. Thus, when reviewing the electronic document in response to the request for review from A, C inputs a comment using the comment function of the electronic document. Then, when C posts the electronic document, the contents input using the comment function are automatically reflected in the message E3.

In the example of FIG. 6, first, A creates the original version of an electronic document, and posts the message E1 to which the electronic document is attached to the group chat. Then, review for the electronic document is requested to other members M. Next, in response to the request for review from A, B posts the message E2 to which a review result for the electronic document to the group chat. Next, in response to the request for review from A, C posts the message E3 to which a review result for the electronic document is attached to the group chat. As described above, the review results from B and C are not changes made to contents of the document but are electronic documents updated by addition of comments from the persons who have made reviews.

In this case, B makes an update to the electronic document by inputting a comment to the original version of the electronic document (file name "XXXX Specifications_K1") created by A, while C makes an update to the electronic document by inputting a comment to the electronic document (file name "XXXX Specifications_K1_B Advice") updated by B. As described above, the electronic document updated by input of a comment by C is not the original version of the electronic document created by A but is the electronic document updated by B. Thus, the consistency of update history information on an electronic document is maintained.

Furthermore, although the case where a review result with respect to the posting of a request for review from A is posted by each of B and C has been explained with reference to FIG. 6, a single member M may post multiple review results. For example, in the case where a single member M posts three review results, when the third review result is posted, a new comment input to the electronic document at the time of the third review is displayed in the "part pointed out" in a message. However, comments input to the electronic document at the times of the first review and the second review are not displayed because these comments have already been notified to a notification destination. Thus, notification information is information on the latest update, and only the latest notification information is provided to a member M specified as a notification destination.

FIG. 7 is a diagram illustrating a specific example of information on update history of an electronic document posted to a group chat.

In FIG. 7, as a specific example of information on update history of an electronic document, document history information R1, R2, and R3 is illustrated. The document history information R1 to R3 is information on update history recorded in chronological order in an electronic document. When updates are made to an electronic document by a member M, the contents of the updates are added each time in chronological order. For example, the document history information R1 in FIG. 7 is recorded in the electronic document (file name "XXXX Specifications_K1") attached to the message E1 in FIG. 6. The document history information R1 and R2 in FIG. 7 is recorded in the electronic document (file name "XXXX Specifications_K1_B Advice") attached to the message E2 in FIG. 6. Furthermore, the document history information R1 to R3 in FIG. 7 is recorded in the electronic document (file name ("XXXX Specifications_K1_B Advice_C Advice") attached to the message E3 in FIG. 6.

Each piece of the document history information R1 to R3 in FIG. 7 contains a person who has made an update to the electronic document, a line updated, the date and time, comments, and contents of change. The "person who has made an update" represents a person who has made the latest update to the electronic document. In the case of the original version of an electronic document to which no update has been made, the person who has created the original version of the electronic document is the "person who has made an update". Thus, the "person who has made an update" for the document history information R1 is "A", the "person who has made an update" for the document history information R2 is "B", and the "person who has made an update" for the document history information R3 is "C".

The "line updated" represents information indicating a line updated by addition of a comment or correction of contents by a member M. In the case of the original version of an electronic document to which no update has been made, "original version" is provided as the "line updated". Thus, the "line updated" for the document history information R1 is "original version", the "line updated" for the document history information R2 is "Line XX, page 2", and the "line updated" for the document history information R3 is "Line XX, page 4".

The "date and time" represents information indicating the date and time when the member M made an update. In the case of the original version of an electronic document to which no update has been made, the date and time when the original version of the electronic document was created is provided as the "date and time". Thus, the "date and time" for the document history information R1 is "01/05/2021", the "date and time" for the document history information R2 is "01/07/2021", and the "date and time" for the document history information R3 is "01/09/2021".

Furthermore, the "comments" represents contents of a comment input by the member M using the comment function of the electronic document. In the case of the original version of an electronic document to which no update has been made, no information is provided because no comment is recorded. Thus, the "comments" for the document history information R1 is blank, the "comments" for the document history information R2 is "YYY is to be corrected.", and the "comments" for the document history information R3 is "ZZZ is to be corrected".

The "contents of change" represents contents of change made to the contents of an electronic document as update. In the case of the original version of an electronic document to which no update has been mode, "original version" is provided as the "contents of change". No change has been made to the electronic documents attached to the messages E2 and E3 in FIG. 6. Thus, the "contents of change" for the document history information R1 is "original version", and the "contents of change" for the document history information R2 and R3 is blank.

Figure 8:
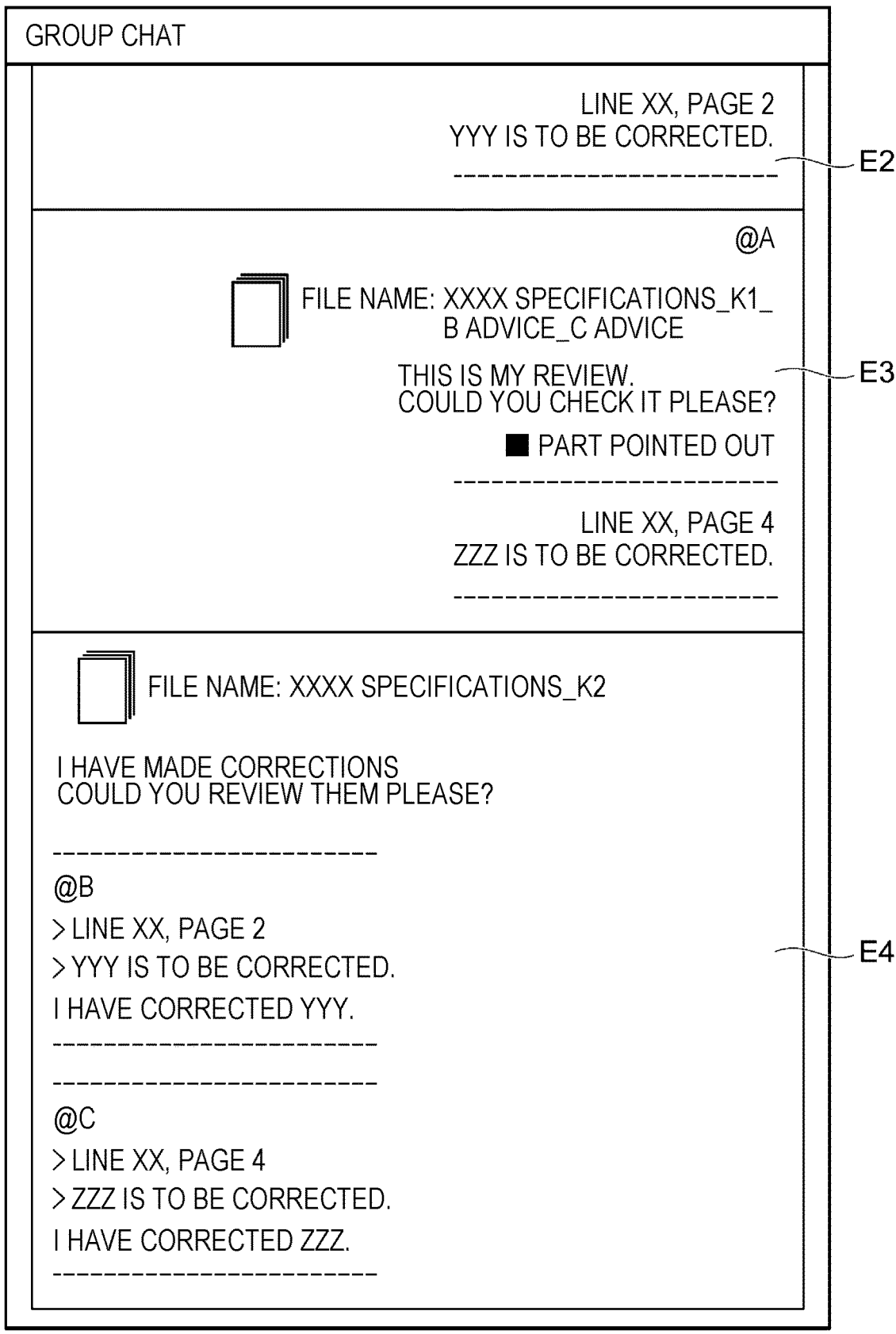
FIG. 8 is a diagram illustrating a specific example of a screen for a group chat displayed on the display unit of the client terminal.

FIG. 8 is a diagram illustrating a specific example of a screen for a group chat displayed on the display unit of the client terminal 50.

As illustrated in FIG. 6, when review results from B and C are posted in response to a request for review from A, A corrects the latest updated version of the electronic document (file name "XXXX Specifications_K1_B Advice_C Advice") posted by C as pointed out by C. Then, as illustrated in FIG. 8, to request B and C for another review for the corrected result, A posts a message E4 "I have made corrections. Could you review them please?".

An electronic document (file name "XXXX Specifications_K2") obtained by correction by A is attached to the message E4. This electronic document (file name "XXXX Specifications_K2") is an updated version of the electronic document (file name "XXXX Specifications_K1_B Advice_C Advice"). As described above, the electronic document to which an update is made by A is not the original version of the electronic document (file name "XXXX Specifications_K1") created by A but is the latest updated version of the electronic document (file name "XXXX Specifications_K1_B Advice_C Advice"). Thus, the consistency of update history information on an electronic document is maintained.

Furthermore, information indicating a part updated and a comment from A are listed as notification information for each notification destination. In the example of FIG. 8, as notification information to be provided to B who is one of the notification destinations, a wording "@B" indicating that the notification information is B is displayed in the message E4. Furthermore, a citation from the message E2 posted by B and a comment from A are displayed in the message E4. The citation from the message E2 contains the wording "Line XX, page 2" as information indicating the part updated at the time of review by B and the wording "YYY is to be corrected." as a comment from B. Furthermore, as a comment from A, the wording "I have corrected YYY." is displayed in the message E4. This comment is input by A using the comment function of the electronic document. Thus, only by visually recognizing the message E4 displayed on the screen for the group chat, B is able to immediately understand that the message E4 is a posting for requesting B as a notification destination for another review.

Furthermore, in the message E4, the wording "@C" indicating that the notification destination is C is displayed. In addition, a citation regarding an item pointed out by C and a comment from A are also displayed. Furthermore, a citation from the message E3 posted by C and a comment from A are also displayed. The citation from the message E3 contains the wording "Line XX, page 4" as information indicating the part updated by C and the wording "ZZZ is to be corrected." as a comment from C. Furthermore, as a comment from A, the wording "I have corrected ZZZ." is also displayed in the message E4. This comment is input by A using the comment function of the electronic document. Thus, only by visually recognizing the message E4 displayed on the screen for the group chat, C is able to immediately understand that the message E4 is a posting for requesting C as a notification destination for another review.

In the example of FIG. 8, continuing from the example of FIG. 6, to deal with the postings of the review results from B and C, A corrects the electronic document and posts the message E4 to which an updated version of the electronic document is attached to the group chat. Accordingly, B and C are requested again to review the electronic document. To request B and C for another review, A does not need to post a message to B and C separately. With only the message E4, B an C are able to be requested for another review at the same time.

FIG. 9 is a diagram illustrating a specific example of information on update history of an electronic document posted to a group chat.

In FIG. 9, as a specific example of information on update history of an electronic document, document history information R1, R2, R3, R4, and R5 is illustrated. The document history information R1 to R5 is information recorded in an electronic document and contents of update added to the document history information R1 to R3 illustrated in FIG. 7 by updating the electronic document. For example, in the electronic document (file name "XXXX Specifications_K2") attached to the message E4 in FIG. 8, the document history information R1 to R5 in FIG. 9 is recorded.

As with the document history information R1 to R3 described above, each piece of the document history information R4 and R5 in FIG. 9 contains a person who has made an update to the electronic document, a line updated, the date and time, comments, and contents of change. The document history information R4 and R5 is information on history of updates made in response to advice from B and C. Thus, the "person who has made an update" for the document history information R4 and R5 is "A". Furthermore, the "line updated" for the document history information R4 is "Line XX, page 2", and the "line updated" for the document history information R5 is "Line XX, page 4". Furthermore, the "date and time" for the document history information R4 and R5 is "01/12/2021". Because correction has been made to the contents of the electronic document, the contents of change are recorded as the "contents of change" for the document history information R4 and R5.

When posting the message E4 to the group chat, A inputs a wording "I have made corrections. Could you review them please?". At this time, A only needs to post an electronic document to which a comment is input using the comment function of the electronic document after making necessary corrections without performing an operation such as specifying a notification destination, so that contents of the notification information to be provided to B as a notification destination and contents of the notification information to be provided to C as a notification destination are automatically reflected in the message E4.

In this case, in the message E4, B and C are each automatically specified as a notification destination. However, a method for automatically specifying a notification destination is not particularly limited and many methods may be used. In this exemplary embodiment, a notification destination is specified on the basis of the difference between persons who have made updates and the similarity in information indicating parts updated in document history information. For example, as illustrated in FIG. 9, different persons have made updates but the same line has been updated in the document history information R2 and the document history information R4. Thus, the notification destination for the document history information R4 is B, who is the person who has made an update in the document history information R2. In a similar manner, different persons have made updates but the same line has been updated in the document history information R3 and the document history information R5. Thus, the notification destination for the document history information R5 is C, who is the person who has made an update in the document history information R3.

The present disclosure is not limited to the exemplary embodiment described above. Advantages of the present disclosure are not limited to those achieved by the exemplary embodiment described above. For example, the system configuration illustrated in FIG. 1 and the hardware configuration illustrated in FIG. 2 are merely exemplifications for achieving an object of the present disclosure and are not particularly limited. Furthermore, the functional configuration illustrated in FIG. 3 is merely an example and is not particularly limited. As long as a function for executing the processes described above is provided in the information processing system illustrated in FIG. 1, the functional configuration for implementing the function is not limited to the example illustrated in FIG. 3.

Furthermore, the orders of steps in the processes illustrated in FIGS. 4 and 5 are merely examples and are not particularly limited. The processes are not necessarily performed in chronological order in the orders of the steps illustrated in FIGS. 4 and 5 and may be performed concurrently or separately. Furthermore, the screens for group chats illustrated in FIGS. 6 and 8 are merely examples of a service screen for a message exchange service and are not particularly limited. Any user interface capable of implementing the message exchange service may be used.

Furthermore, items of the document history information illustrated in FIGS. 7 and 9 are merely examples. Document history information may contain any information that may be used as information on update history of an electronic document.

Furthermore, for an easier understanding, the case where an update of a single part of an electronic document is made by a person has been described in an exemplary embodiment described above. However, obviously, updates may be made to multiple parts by a person. In this case, for example, in the case where comments for multiple parts in an electronic document (file name "XXXX Specifications_K1_B Advice") attached to the message E2 illustrated in FIG. 6 are provided, multiple pieces of notification information for the corresponding parts updated may be listed below "part pointed out" in the message E2.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
at least one memory; and
at least one processor configured to:
acquire, by the at least one processor, from a computer network, information indicating that an electronic document was posted to a message exchange service;
acquire, by the at least one processor, from the at least one memory, in response to the at least one processor acquiring the information indicating that the electronic document was posted, information about a person who posted the electronic document and information about an update history of the electronic document;
determine, by the at least one processor, using the acquired information about the person who posted the electronic document, the person who posted the electronic document;
determine, by the at least one processor, using the acquired information about the update history:
a person who made a latest update to the electronic document; and
a person who created an original version of the electric document;
determine, by the at least one processor, in response to the determined person who posted the electronic document, the determined person who made the latest update to the electronic document, and the determined person who originally created the electric document, a notification destination to whom a notification indicating that the electronic document has been posted is to be provided; and control, by the at least one processor, providing, using the computer network, notification information containing at least information indicating the determined notification destination to the notification destination.

2. The information processing device according to claim 1, wherein the at least one processor is configured to determine the person who posted the electronic document from the information about the person who posted the electronic document, and wherein the at least one processor is configured to determine the person who created the original version of the electronic document and the person who made the latest update from the information about the update history.

3. The information processing device according to claim 2, wherein the at least one processor is configured to, if the determined person who posted the electronic document and the determined person who made the latest update to the electronic document are the same, and if the determined person who posted the electronic document and the determined person who created the original version of the electronic document are not the same, determine the person who created the original version of the electronic document as the notification destination.

4. The information processing device according to claim 2, wherein the at least one processor is configured to, if the determined person who posted the electronic document, the determined person who made the latest update to the electronic document, and the determined person who created the original version of the electronic document are the same, determine a person who made another update that has caused the latest update as the notification destination.

5. The information processing device according to claim 4, wherein the at least one processor is configured to determine, as the notification destination, a person who is different from the determined person who created the original version of the electronic document from among persons who have made updates to a part of the electronic document to which the latest update has been made, from the information about the update history.

6. The information processing device according to claim 5, wherein the at least one processor is configured to, if a number of updates made by the determined person who created the original version of the electronic document to the part of the electronic document to which the latest update has been made is n, wherein n represents an integer of 2 or more, determine, as the notification destination, a person who is different from the determined person who created the original version of the electronic document and has made an update to the part of the electronic document later than an n-1th update.

7. The information processing device according to claim 1, wherein the at least one processor is configured to control providing the notification information to the notification destination, by controlling displaying the notification information on a service screen for the message exchange service.

8. The information processing device according to claim 7, wherein the at least one processor is configured to control providing, as the notification information, information indicating a part in the electronic document to which an update has been made, to the notification destination.

9. The information processing device according to claim 7, wherein the at least one processor is configured to control providing, as the notification information, information for accessing the electronic document, to the notification destination.

10. An information processing system comprising:
at least one memory; and
at least one processor configured to implement:
an acquisition unit that acquires, by the at least one processor, from a computer network, information indicating that an electronic document was posted to a message exchange service;
wherein the acquisition unit acquires, by the at least one processor, from the at least one memory, in response to the at least one processor acquiring the information indicating that the electronic document was posted to a message exchange service, information about a person who posted the electronic document and information about an update history of the electronic document;
a determining unit that:
determines, by the at least one processor, using the acquired information about the person who posted the electronic document, the person who posted the electronic document; and
determines, by the at least one processor, using the acquired information about the update history:
a person who made a latest update to the electronic document; and
a person who created an original version of the electric document;
determines, by the at least one processor, in response to the determined person who posted the electronic document, the determined person who made the latest update to the electronic document, and the determined person who originally created the electric document, a notification destination to whom a notification indicating that the electronic document has been posted is to be provided; and
a notification control unit that controls, by the at least one processor, providing, using the computer network, notification information indicating the determined notification destination to the notification destination.

11. A non-transitory computer readable medium storing a program, which, if executed, causes a computer to execute a process comprising:
acquiring, by at least one processor of the computer, from a computer network, information indicating that an electronic document was posted to a message exchange service;
acquiring, by the at least one processor, from at least one memory of the computer, in response to the at least one processor acquiring the information indicating that the electronic document was posted, information about a person who posted the electronic document and information about update history of the electronic document;
determining, by the at least one processor, using the acquired information about the person who posted the electronic document the update history, the person who posted the electronic document;
determining, by the at least one processor, using the acquired information about the update history:
a person who made a latest update to the electronic document; and
a person who created an original version of the electric document;

determining, by the at least one processor, in response to the determined person who posted the electronic document, the determined person who made the latest update to the electronic document, and the determined person who originally created the electric document, a notification destination to whom a notification indicating that the electronic document has been posted is to be provided; and controlling, by the at least one processor, providing, using the computer network, notification information indicating the determined notification destination to the notification destination.

\* \* \* \* \*